US005611497A

United States Patent [19]
Krambeck et al.

[11] Patent Number: 5,611,497
[45] Date of Patent: Mar. 18, 1997

[54] ACTIVE TENSION REDUCER FOR THE SEAT BELT OF A SAFETY RESTRAINT SYSTEM

[75] Inventors: Dagoberto Krambeck, Troy; Monte G. Watson, Ferndale, both of Mich.

[73] Assignee: AlliedSignal Inc., Morristown, N.J.

[21] Appl. No.: 506,221

[22] Filed: Jul. 24, 1995

[51] Int. Cl.⁶ .................................................. B60R 22/44
[52] U.S. Cl. ........................... 242/375.1; 242/375.3
[58] Field of Search .............................. 242/375, 375.1, 242/375.3; 280/806, 807

[56] References Cited

U.S. PATENT DOCUMENTS

| | | | |
|---|---|---|---|
| 4,487,381 | 12/1984 | Kubota | 242/375.3 |
| 4,529,143 | 7/1985 | Kanada et al. | 242/375.3 |
| 4,546,933 | 10/1985 | Kanada et al. | 242/375.3 |
| 4,588,144 | 5/1986 | Nishimura | 242/375.3 |
| 4,630,841 | 12/1986 | Nishimura et al. | 242/375.1 |
| 4,655,312 | 4/1987 | Frantom et al. | 180/268 |
| 4,726,537 | 2/1988 | Escaravage | 242/375.3 |
| 4,866,223 | 9/1989 | Collins et al. | |

*Primary Examiner*—John P. Darling
*Attorney, Agent, or Firm*—Markell Seitzman

[57] ABSTRACT

An active tension remover for the seat belt of a safety restraint system having a housing attached to the seat belt retractor of the safety restraint system. A spring cap is rotatably supported in the housing and encloses a coil spring having one end attached to spring cap and the other end attached to spool of the retractor on which the seat belt is wound. A bi-directional motor disposed in the housing is operative to rotate the spring cap relative to the housing. A logic control responsive to the buckling the seat belt about the occupant of the seat actuates the motor to unwind the seat belt spool a predetermined number of turns to reduce the tension exerted by the seat belt in the shoulder of the occupant and to rewind the seat belt spool to its initial position in response to the unbuckling of the seat belt.

14 Claims, 2 Drawing Sheets

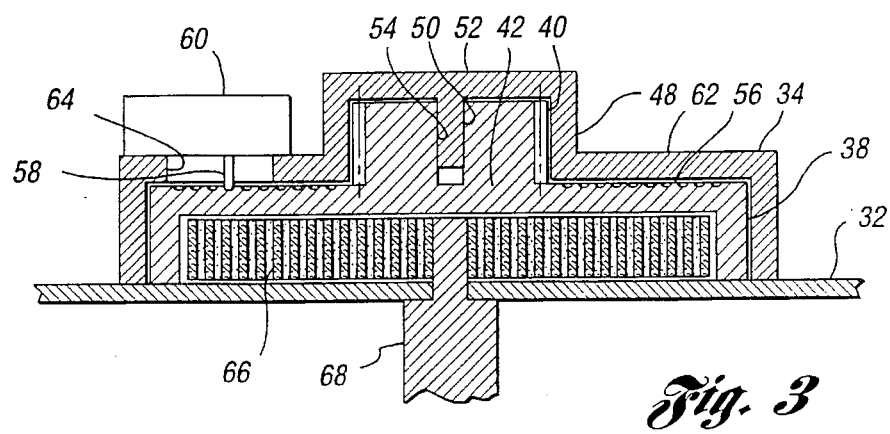
*Fig. 3*
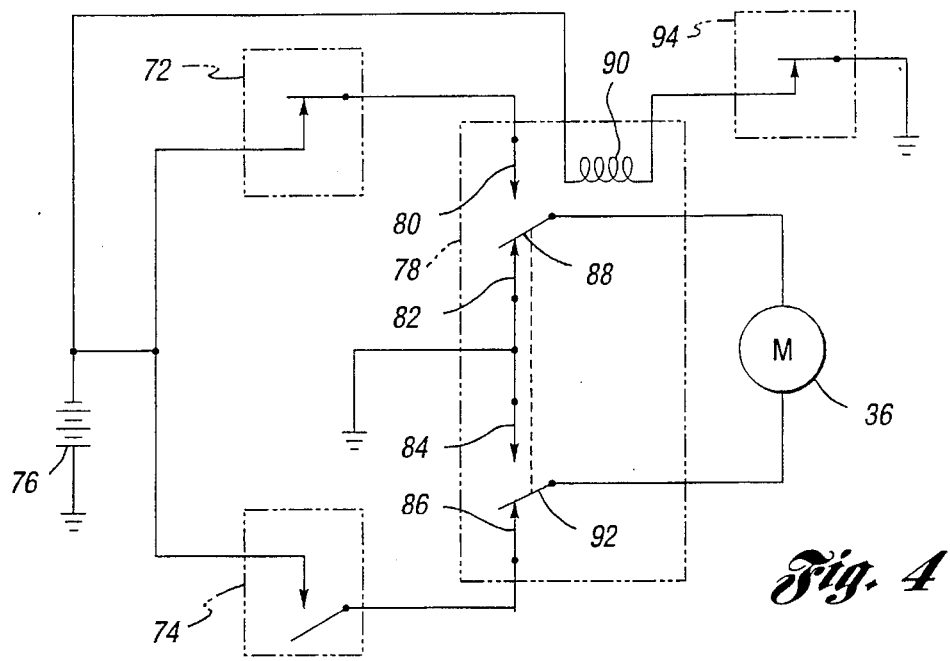
*Fig. 4*
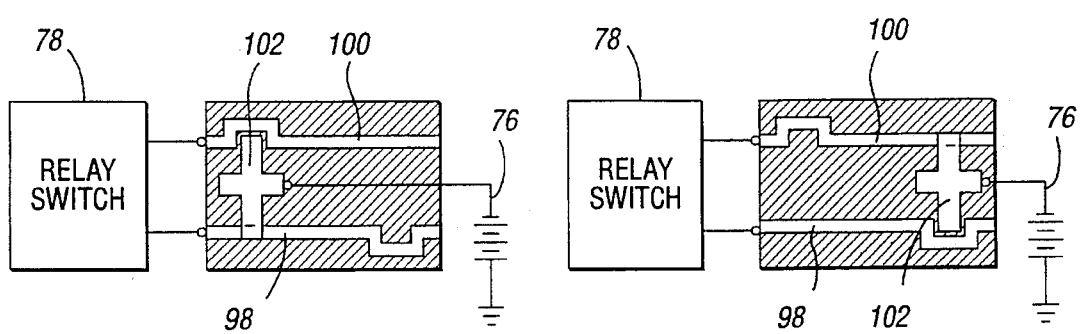
*Fig. 5a*  *Fig. 5b*

ACTIVE TENSION REDUCER FOR THE SEAT BELT OF A SAFETY RESTRAINT SYSTEM

TECHNICAL FIELD

The invention is related to the field of safety restraint systems and, in particular, to a tension reducer for the shoulder portion of the seat belt.

BACKGROUND ART

Current safety restraint systems have a seat belt which is mechanically retracted against the shoulder of the occupant of the seat. In many applications, the tension of the shoulder portion of the seat belt against the shoulder, and often against the neck of the occupant, has been a source of irritation. For the seat belt to be fully retracted onto the spool of the retractor in the undeployed state, a sufficient force must be generated by the retractor's retraction spring to rotate the retractor's spool a required number of turns. As a consequence, when the safety restraint system is deployed, the shoulder portion of the seat belt exerts excess force on the shoulder of the occupant.

To eliminate this problem, some of the early models of seat belt retractors had a manually adjustable tension remover in which a portion of the seat belt could be unwound from the retractor's spool and the retractor's spool would automatically be prohibited from rewinding the manually adjusted slack. However, this proved to be unsatisfactory from a safety point of view because many of the occupants adjusted the seat belt to have too much slack. This resulted in the occupant's upper body, and in particular, the occupant's head, to be thrown against the dashboard of the vehicle or the windshield in the event of an accident or sudden stop.

Frantom et al., in U.S. Pat. No. 4,655,312, teaches an electrically adjustable safety restraint system in which an electric motor is energized in response to the buckling of the adjustable tongue into buckle of the safety restraint system to wind the seat belt on the retractor's spool until a predetermined tension is detected. After the predetermined tension is sensed, the electric motor is reversed for a predetermined period of time selected to produce a predetermined slack on the shoulder portion of the seat belt.

DISCLOSURE OF THE INVENTION

The invention is an active tension reducer for the shoulder portion of the seat belt of a safety restraint system. The safety restraint system has a retractor having a frame rotatably supporting a spool and a seat belt adapted to be wound on the spool. A housing is fixedly attached to the frame of the retractor adjacent to one end of the spool. A spring cap is rotatably disposed in the housing concentric with one end of the spool and tension remover is adapted to rotate the spring cap relative to the frame between a first position and a second position. A spiral retractor spring has one end connected to the spool and the opposite end connected to the spring cap, the spiral spring producing a resilient torque rotating the spool in a first direction winding the seat belt on the spool.

A manually activated switch having a first state activating the tension remover to rotate the spring cap in the first direction from the second position to the first position and a second state activating the tension remover to rotate the spring cap in a direction opposite the first direction from the first position to the second position. The rotation of the spring cap from the first position to the second position unwinding the spiral spring an amount sufficient to produce a predetermined reduction of the tension exerted on the shoulder of the occupant by the seat belt.

The object of the invention is to automatically reduce the tension on the shoulder portion of the seat belt in a safety restraint system after the safety restraint system is deployed about the occupant.

Another object of the invention is to unwind the retractor's spool a predetermined number of revolutions to produce a desired reduction of the tension of the seat belt against the occupant's shoulder.

Another object of the invention is to electrically control the number of revolutions of the spool in the reverse direction to produce the desired slack.

Still another object of the invention is the use of limit switches to control the number of turns the retractor's spiral spring is unwound.

Another object of the invention is to rewind the spool relative to the housing when the seat belt is unbuckled.

These and other objects will become apparent from a reading of the best mode for carrying out the invention in conjunction with the drawings.

BRIEF DESCRIPTION OF THE DRAWINGS

FIG. 3 is a cross-sectional side view of the active tension reducer;

FIG. 4 is a circuit diagram of the logic control;

FIG. 5A is a mechanical representation of the limit switch 60 in a first state; and FIG. 5B is a mechanical representation of the limit switch 60 in a second state.

BEST MODE FOR CARRYING OUT THE INVENTION

Figure 1:
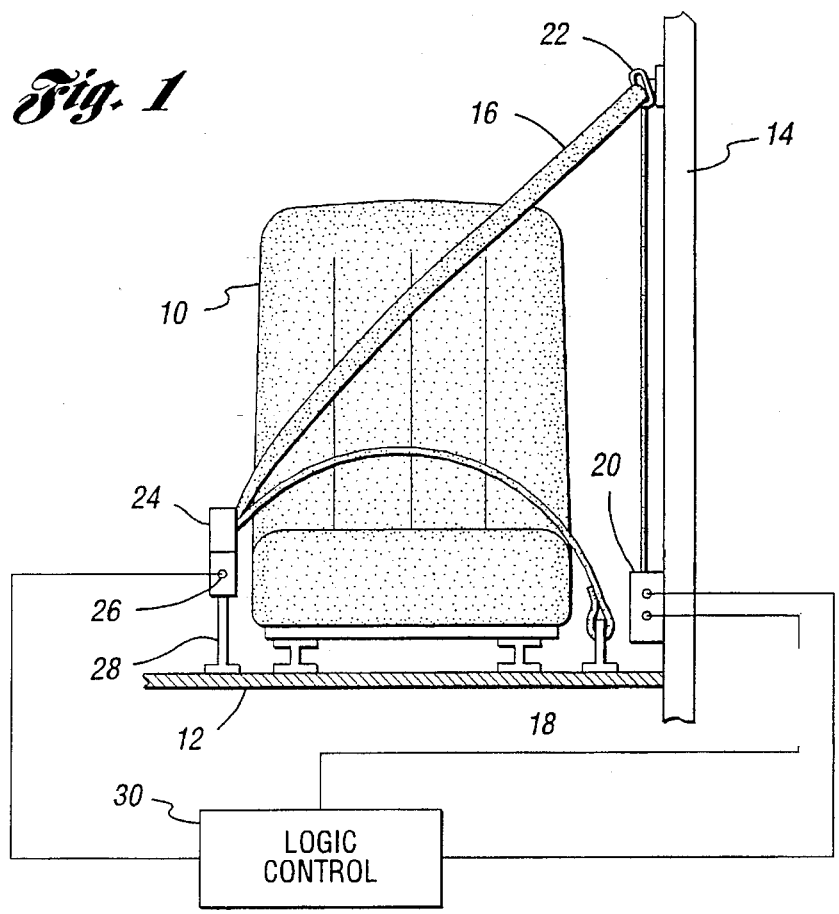
FIG. 1 is a schematic drawing of the safety restraint system incorporating the active tension reducer.

Although the active tension reducer for a seat belt retractor will be described with reference to a continuous loop three point safety restraint system having a single seat belt retractor, the concept is equally applicable to three point systems having dual retractors or two point lap or shoulder belt systems having a single retractor. It is not intended that the active tension reducer be limited to the specific embodiment illustrated in the drawings and described herein.

Referring to FIG. 1, there is shown the basic components of a continuous three point safety restraint system in conjunction with the passenger seat 10 of an automotive vehicle. The passenger seat 10 is attached to the floor 12 of the vehicle in a conventional manner. The seat 10 may have a fixed relationship to the floor 12 or may be adjustable as is known in the art.

Adjacent to the seat 10 is a side pillar 14 or comparable structural member of the vehicle to which a shoulder portion of the three point safety restraint system is attached. A seat belt 16 or webbing is connected at one end to an anchor bracket 18 attached to the floor 12 on one side of the seat 10 or directly to the frame of the seat as is known in the art. The opposite end of the seat belt 16 is connected to a spring-loaded retractor 20, conventionally attached to the pillar 14 as shown. Alternatively, the retractor 20 may be attached to the floor 12, the back of the seat 10 or any other structural member of the vehicle.

The seat belt 16, as shown, is entrained through a web guide 22 attached to the pillar 14 at an elevated location, normally above the location of the shoulder of an occupant of the seat 10 in a conventional manner. The portion of the seat belt 16 between the web guide 22 and the anchor bracket 18 is divided into a lap portion and a shoulder portion by an adjustable tongue 24.

The adjustable tongue 24 is receivable in a buckle 26, as shown, attached to the floor 12 by a semi-rigid buckle support 28 or any other structural member of the vehicle on the side of the seat 12 opposite the anchor bracket 18. The buckle 26 may include an electrical switch 94, shown in FIG. 4, which generates an electrical signal signifying that the occupant of the seat has deployed the safety restraint system and has latched the tongue 24 into the buckle 26. As shall be discussed later with reference to FIG. 4, the switch 94 may be independent of the buckle 26.

A logic control 30 is responsive to the signal generated by switch 94 when the tongue is latched in the buckle 26 to energize a motor 36 associated with the retractor 20 to unwind the spring-loaded web spool of the retractor 20 until a desired tension of the seat belt against the shoulder of the occupant of the seat 10 is obtained.

The logic control 30 is also responsive to the termination of the signal generated by the switch 94, such as when the tongue 24 is unlatched from the buckle 26 to rewind the spool of the retractor 20 back to its original position.

Figure 2:
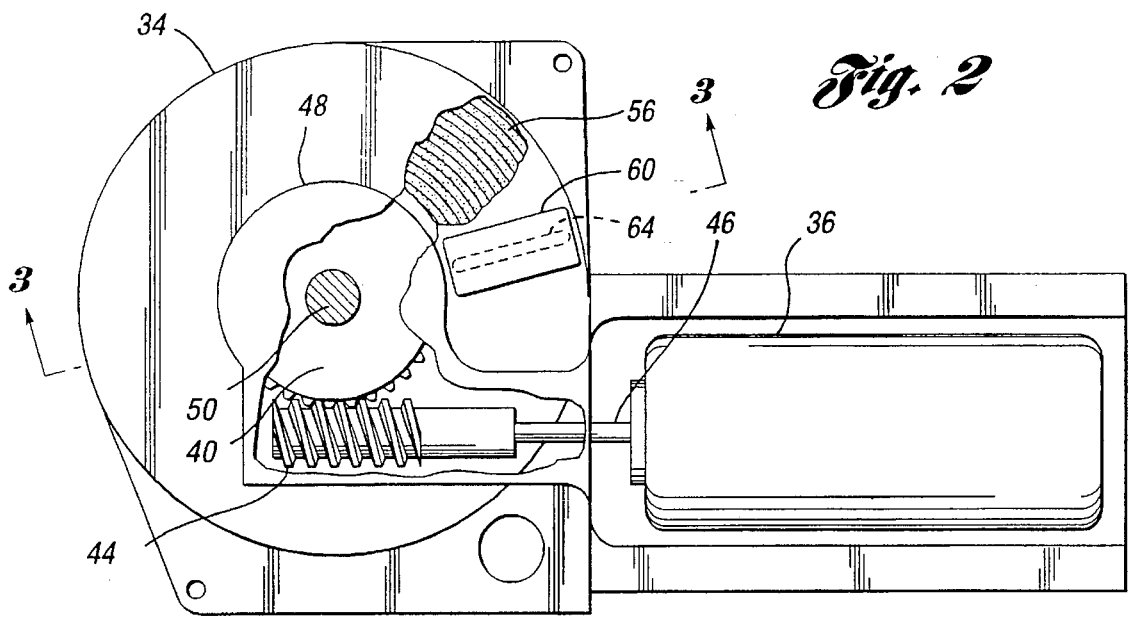
FIG. 2 is a top view of the active tension reducer.

The details of the mechanical portion of the active tension reducer are shown in FIGS. 2 and 3. The active tension reducer is attached to the frame 32 of the seat belt retractor 20, as shown in FIG. 3, in place of the conventional spring cap. The active tension reducer has housing 34 enclosing a reversible DC motor 36 and a cup-shaped spring cap 38. A worm gear 40 is provided on the external surface 42 of the spring cap 38 which is engaged by a worm 44 as shown in FIG. 2. The worm 44 is attached to the output shaft 46 of the DC motor 36 and is rotated thereby. As shown more clearly in FIG. 3, the worm gear 40 is enclosed in a gear cap 48 of the housing 34 and is rotatably supported therein by an axial pin 50. The axial pin 50 protrudes inwardly from the top 52 of the gear cap 48 and is received in an axial bore 54 provided in the worm gear 40 as shown.

The worm gear 40 may be formed integral with the spring cap 38 or may be a separate member attached to the spring cap.

A spiral groove 56 is provided on the outer surface 42 of the spring cap 38 which is engaged by a groove follower 58 extending from a limit switch 60 mounted on the external surface 62 of the housing 34. The groove follower 58 extends through a radial slot 64 provided through the cap 38 and moves radially as the spring case 38 is rotated relative to the housing 34.

A limit switch 60 embodies two limit switches, switches 72 and 74, as shown in FIG. 4 and is responsive to the displacement of the groove follower 58 to open the switch 72 in response to a predetermined displacement of the groove follower in a first direction indicative of a predetermined number of revolutions of the spring cap 38 relative to the housing 34 and to open switch 74 in response to the displacement of groove follower 58 the same distance in the reverse direction by the reverse rotation of the spring cap 38 relative to the housing 34.

The spring cap 38 encloses a coil spring 66 having one end attached to webbing spool 68 of the retractor 20 and the opposite end is attached to the periphery of the spring cap 38. The coil spring 66 is preloaded in assembly to produce a torque sufficient to wind a length of the seat belt 16 on the spool 68 sufficient to take the slack out of the seat belt when the tongue 24 is unlatched from the buckle 26 and is not deployed about the occupant. This is normally referred to as the stored condition of the seat belt.

The operation of the active tension reducer will now be described relative to the electrical circuit diagram of the logic control 30 shown on FIG. 4. In the stored condition of the safety restraint system, prior to the occupant deploying the seat belt and inserting the tongue 24 in the buckle 26, the limit switches 72 and 74 and relay switch 78 are in the positions shown in FIG. 4. In this state, the first limit switch 72 is closed and the second limit switch 74 is open. The first and second limit switches are connected between a battery 76 and the double pole double throw relay switch 78. The relay switch 78 has a first electrical contact 80 connected to the first limit switch 72, a second contact 82 connected to ground, a third electrical contact 84 connected to the second electrical contact and to ground and a fourth electrical contact 86 connected to the second limit switch 74. The relay switch in the unactuated state has a first pole 88 electrically contacting the second electrical contact 84 and is switchable to contact the first electrical contact 82 in response to the energizing of the relay coil 90. The relay switch 78 in the unactuated state also has a second pole 92 electrically contacting the fourth electrical contact 86 and switchable to contact the third electrical contact 84 in response to the energizing of relay coil 90.

Pole 88 is connected to one input of the reversible DC motor 36 while the pole 92 is connected to the opposite input to the reversible DC motor 36.

The relay coil 90 is connected between the battery 76 and ground through the switch 94 which may be incorporated in the buckle 26 as described relative to FIG. 1 or may be a separate switch independently activated by the occupant of the seat.

After the occupant of the seat 10 deploys the seat belt and inserts the tongue 24 in the buckle 26 the switch 94 is actuated to the closed position. If the switch 94 is embodied in the buckle 26, the insertion of the tongue into the buckle will automatically close switch 94. Otherwise the switch 94 will have to be manually actuated by the occupant.

The closing of the switch 94 energizes the relay coil 90 and the poles 88 and 92 are toggles to contacts 80 and 84 respectively. With the limit switch 72 being closed, electrical power is supplied to the motor 36 which rotates the spring cap in a direction unwinding coil spring 66 and reducing the torque being applied to the spool 68. This in turn reduces the tension of the seat belt 16 on the occupant's shoulder. The spring cap 34 will be rotated a predetermined number of turns, for example approximately 9 turns, until the switch 72 of the limit switch 60 is opened and limit switch 74 is closed. The opening of switch 72 terminates battery power to the motor 36, the motor 36 stops and the worm 44 holds the spring cap in the unwound state. The logic control 30 will remain in this state until the switch 94 is opened.

Upon opening of switch 94, the relay coil 90 is de-energized, and the poles 88 and 92 return to the positions shown on FIG. 4. Since limit switch 74 is now in the closed state, electrical power from battery 76 is applied to the motor 36 in the reverse direction causing the motor to rotate the spring cap in a direction rewinding the spring 66. This winding of the spring 66 will continue until limit switch 74 is opened. The opening of limit switch 74 terminates electrical power to the motor 36 and the position of the spring cap 38 is locked in its initial position relative to the housing 34 by the engagement of the worm gear 40 with the worm 44.

FIGS. 5A and 54 are a schematic representation of the limit switch 60. The limit switch has an electrically non-conductive body 96 and two parallel contact strips 98 and 100. Contact strips 98 and 100 are electrically connected to the contacts 80 and 86 respectively of the relay switch 78. The limit switch also has a slidable contact 102 slidably engageable with contact strips 98 and 100. The slidable contact 102 is electrically connected to the battery 76 and physically connected to the groove follower 58 and is movable therewith along the contact strips.

When the spring cap 38 is in its initial position, the slidable contact 102 electrically engages contact strip 98 and is disengaged from contact strip 100 as shown in FIG. 5A. This state represents the state of limit switches 72 and 74 as shown in FIG. 4. When the spring cap 88 has been rotated to unwind spring 66, to reduce the tension on the seat belt, the slidable contact 102 is moved by the groove follower 58 to a position in which it engages contact strip 100 and is disengaged from contact strip 98 as shown in FIG. 5B. When the limit switch 60 is in this state, limit switch 72 is open and limit switch 74 is closed, which is opposite the state shown in FIG. 4 and the motor 36 can only be energized to rotate the spring cap 38 in the reverse direction.

When the switch 94 is opened, the relay switch is deenergized and the poles 88 and 92 return to the state shown in FIG. 4. Electric power is now supplied to the motor from battery 76 in the reverse direction causing the motor to rotate in the reverse direction and rotate the spring cap in a direction to wind spring 66. Again the groove follower will move the slidable contact 102 back to the position shown in FIG. 5A in which the limit switch 74 is opened and limit switch 72 is closed as shown in FIG. 4.

Having disclosed the active tension reducer for the seat belt of a safety restraint system, it is recognized that those skilled in the art may make changes or improvements to the active tension reducer within the scope of the appended claims.

What is claimed is:

1. A seat belt retractor having an active tension reducer, the retractor comprising:
    a frame rotatably supporting a spool and a seat belt receivable on the spool, the spool biased by a spiral spring producing a nominal spring force sufficient to rewind all of the seat belt if same is fully extended from the spool;
    a housing fixedly attached to the frame of the retractor adjacent one end of the spool;
    a spring cap rotatably disposed in said housing concentric with said one end of the spool;
    the spiral spring connected between the spool and the periphery of said spring cap, said spiral spring biasing said spool to rotate in a first direction winding the seat belt on the spool;
    a manually activated switch having an open state and a closed state;
    tension remover means responsive to a change in state of the switch indicative of the seat belt being placed about an occupant, for rotating said spring cap in said first direction to unwind the spiral spring a predetermined number of turns to reduce the spring force from its nominal value thereby reducing the tension applied to the shoulder of the occupant and responsive to another change in state of the switch, indicative that the seat belt is being removed from about the occupant for rotating said spring cap in a second direction opposite said first direction by said predetermined number of turns to restore said spring force to its nominal value permitting the seat belt to be fully rewound.

2. The active tension remover of claim 1 wherein said tension remover means comprises:
    a reversible DC motor disposed in said housing, said DC motor having a rotatable output; a gear train connecting the rotatable output of said DC motor to said spring cap to rotate said spring cap said predetermined number of turns in said first and second directions; and logic means responsive to said manually actuated switch being in said open state and said spring cap being in said first position for generating a signal activating said motor rotate said spring cap from said first position to said second position and responsive to switch being in said closed state and said spring cap being in said second position for generating a signal activate said motor to rotate said spring cap in said second direction from said second position to said first position.

3. The active tension remover of claim 2 wherein said logic means comprises:
    a relay switch having a first state in response to said manually activated switch being in said open state to activate said motor to rotate said spring cap from said first position towards said second position and a second state in response to said manually actuated switch being in said closed state to actuate said motor to rotate said spring cap from said second position towards said first position; and
    a limit switch connected between a source of electrical power and said relay switch to supply electrical power to said motor in response to said spring cap being in said first position and said relay switch being in said first state and to supply electrical power to said motor in response to said spring cap being in said second position and said relay switch being in said second state.

4. The tension remover of claim 1 wherein said seat belt has a tongue receivable in a buckle to lock the seat belt about the occupant seated in the vehicle, said manually activated switch is incorporated in said buckle and has said open state when said tongue is disengaged from said buckle and said closed state when said tongue is received in said buckle and locked therein.

5. The device as defined in claim 1 wherein the predetermined number of turns is approximately 9.

6. A seat belt retractor of a safety restraint system comprising
    a frame rotatably supporting a spool and a seat belt receivable on the spool;
    a housing fixedly attached to the frame of the retractor adjacent one end of the spool;
    a spring cap rotatably disposed in said housing concentric with said one end of the spool;
    tension remover means for rotating said spring cap between a first position and a second position relative to said housing;
    a spiral spring connected between one end of the spool and the periphery of said spring cap, said spiral spring biasing said spool to rotate in a first direction winding the seat belt on the spool;
    a switch having an open state and a closed state, said switch in said open state generating a first signal activating said tension remover means to rotate said spring cap in said first direction from said first position to said second position and in said closed state generating a second signal activating said tension remover means to rotate said spring cap in a second direction opposite said first direction from said second position to said first position to unwind said spiral spring and to reduce the tension applied to the shoulder of an occupant of the seat by the seat belt due to said spiral spring, wherein said spring cap has a spiral groove concentric with said spool said limit switch comprises:

a groove follower engaging said spiral groove, said groove follower radially displaced by the rotation of said spring cap;

a normally closed first limit switch connected between the source of electrical power and said relay switch, said first limit switch being opened in response to said groove follower being displaced to a first radial position by a rotation of said spring cap in said first direction; and a normally closed second limit switch connected between the source of electrical power and said relay switch said second limit switch being opened in response to said groove follower being radially displaced to a second radial position by a rotation of said spring cap in said second direction.

7. The tension remover of claim 6 wherein said relay switch is a double pole double throw relay switch, having a first pole, a second pole, a normally closed contact associated with each pole and a normally open contact associated with each pole.

8. The tension remover of claim 7 wherein said first limit switch is connected to the normally open contact associated said first pole, said second limit switch is connected to said normally closed contact associated with said second pole, said normally closed contact associated with first pole and said normally open contact associated with said second pole are connected to ground, and said motor is connected between said first and second poles.

9. The device of claim 6 wherein said seat belt has a tongue receivable in a buckle to lock the seat belt about the occupant seated in the vehicle, said manually activated switch is incorporated in said buckle and has said open state when said tongue is disengaged from said buckle and said closed state when said tongue is received in said buckle and locked therein.

10. An active tension remover for the retractor of a safety restraint system, the retractor having a frame rotatably supporting a spool, and a seat belt having one end attached to the spool and adapted to be wound thereon, said tension remover comprising:

a housing fixedly attached to the frame of the retractor adjacent to one end of the spool;

a spring cap rotatably disposed in said housing, said spring cap having a worm gear;

a spiral spring disposed in said spring cap, one end of said spiral spring being fixedly attached to said spring cap and the opposite end connected to said spool said spiral spring biasing said spool to rotate in a first direction to wind the seat belt on the spool;

a reversible electric motor attached disposed in said housing, said motor having a rotary output;

a worm attached to said rotary output, said worm engaging said worm gear to rotate said spring cap relative to said housing with the rotation of said rotary output of said motor in said first and an opposite site direction;

a manually activated switch having an open state and a closed state;

a first limit switch switchable from a normally closed state to an open state in response to the rotation of said spring cap a predetermined number of turns in said first direction;

a second limit switch switchable from a normally closed state to an open state in response to the rotation of said spring cap said predetermined number of turns in said opposite direction;

a relay switch switchable from a first state to a second state in response to said manually activated switch being switched from said open state to said closed state, said relay switch in said first state connecting said second limit switch to one input of the motor and the other input to the motor to ground, and in said second state connecting said first limit switch to said other input to said motor and said first input to the motor to ground.

11. The tension remover of claim 10 wherein said safety restraint system has a tongue attached to said seat belt and a buckle in which said tongue is latchable therein, said manually activated switch is embodied in said buckle and is switched to said closed state in response to the tongue being latched in said buckle.

12. The device as defined in claim 10 wherein the predetermined number of turns is approximately 9.

13. A retractor of a safety restraint system comprising:

a frame rotatably supporting a spool, and a seat belt having one end attached to the spool and adapted to be wound thereon said tension remover comprising:

a housing fixedly attached to the frame of the retractor adjacent to one end of the spool;

a spring cap rotatably disposed in said housing, said spring cap having a worm gear;

a spiral spring disposed in said spring cap, one end of said spiral spring being fixedly attached to said spring cap and the opposite end connected to said spool said spiral spring biasing said spool to rotate in a first direction to wind the seat belt on the spool;

a reversible electric motor attached disposed in said housing said motor having a rotary output;

a worm attached to said rotary output, said worm engaging said worm gear to rotate said spring cap relative to said housing with the rotation of said rotary output of said motor in said first and an opposite direction;

a manually activated switch having an open state and a closed state;

a first limit switch switchable from a normally closed state to an open state in response to the rotation of said spring cap a predetermined number of turns in said first direction;

a second limit switch switchable from a normally closed state to an open state in response to the rotation of said spring cap said predetermined number of turns in said opposite direction;

a relay switch switchable from a first state to a second state in response to said manually activated switch being switched from said open state to said closed state, said relay switch in said first state connecting said second limit switch to one input of the motor and the other input to the motor to ground, and in said second state connecting said first limit switch to said other input to said motor and said first input to the motor to ground, wherein said spring cap has a spiral groove provided therein and a groove follower engaging said spiral groove, said groove follower displaceable between a first radial position and a second radial position in response to said spring cap being rotated said predetermined number of turns in said first direction, said groove follower activating said first limit switch to said open state in response to said groove follower being in said first radial position and activating said second limit switch to said open state in response to said groove follower being in said second position.

14. The device as defined in claim 13 wherein the predetermined number of turns is approximately 9.

* * * * *